April 24, 1973 R. F. ANDERSON 3,729,526
HYDROGEN FLUORIDE STRIPPING TO SEPARATE HYDROCARBONS
AND ALKYL FLUORIDES IN ALKYLATION PROCESS
Filed April 5, 1971
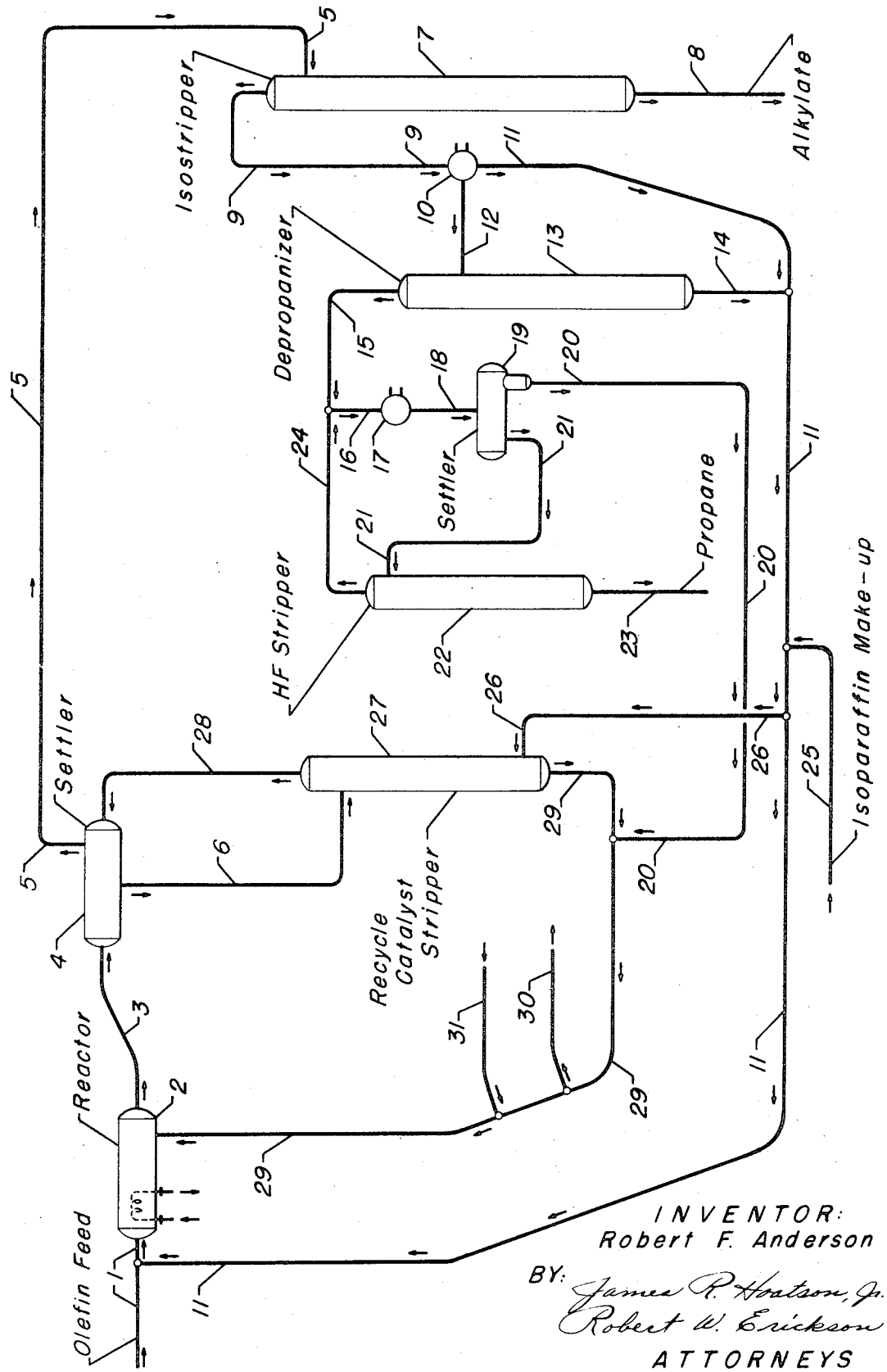
INVENTOR:
Robert F. Anderson
BY: James R. Hoatson, Jr.
Robert W. Erickson
ATTORNEYS

United States Patent Office 3,729,526
Patented Apr. 24, 1973

3,729,526
HYDROGEN FLUORIDE STRIPPING TO SEPARATE HYDROCARBONS AND ALKYL FLUORIDES IN ALKYLATION PROCESS
Robert F. Anderson, La Grange Park, Ill., assignor to Universal Oil Products Company, Des Plaines, Ill.
Filed Apr. 5, 1971, Ser. No. 131,198
Int. Cl. C07c 3/54
U.S. Cl. 260—683.48                                    6 Claims

ABSTRACT OF THE DISCLOSURE

The reaction mixture from HF alkylation of isoparaffin with an olefin-acting reactant is separated into a hydrocarbon and catalyst phases, unreacted isoparaffin from the hydrocarbon phase strips the catalyst phase to separate an overhead stream of hydrocarbons and alkyl fluorides, and the stripped liquid catalyst is then passed to the alkylation reaction. The separated stream of hydrocarbons and alkyl fluorides may be supplied to the reaction mixture undergoing phase separation to recover valuable hydrocarbons from said overhead stream as a portion of the alkylate product.

BACKGROUND

This invention relates to a process for alkylating an alkylatable hydrocarbon reactant with an olefin-acting reactant utilizing hydrogen fluoride catalyst. In one aspect, this invention relates to a process for producing an isoparaffin-olefin reaction product having excellent anti-knock properties. In another aspect, this invention relates to an alkylation process which provides a high yield of valuable alkylate product. More specifically, this invention relates to a process for producing an alkylate product from an alkylatable reactant and an olefin-acting reactant, utilizing hydrogen fluoride catalyst which comprises admixing the reactants and catalyst, separating the mixture into a catalyst stream and a hydrocarbon stream, recovering the product in the hydrocarbon stream, and stripping the catalyst stream with a portion of the alkylatable reactant to recover a second catalyst stream and a second hydrocarbon stream.

Hydrogen fluoride-catalyzed alkylation processes are well known as a method for producing higher molecular weight hydrocarbons from lower molecular weight alkylatable hydrocarbons and olefins, or olefin-acting agents. The product of these processes is normally used as a blending stock in motor fuels. Motor fuel alkylate produced by catalytic alkylation possesses excellent anti-knock properties, so that it has been used to upgrade lower quality fuel components to the high octane ratings required by modern gasoline engines. A large part of the utility of motor fuel alkylate has been the result of its response to lead compounds. The octane rating of alkylate may be raised considerably by the addition of small amounts of such compounds as tetraethyl or tetramethyl lead. Environmental considerations have now created a demand for motor fuels which are lead free; however, the octane requirements for motor fuel remain high. The anti-knock properties required in motor fuel alkylate are, therefore, much higher. The process of the present invention provides a method for producing an alkylate of high quality to satisfy these requirements.

Alkylation processes in prior art have, in general, been effected by contacting the reactants and the catalyst to form an alkylation reaction mixture, allowing the mixture to settle into a hydrocarbon phase and a catalyst phase, and recovering the product from the hydrocarbon phase. The hydrocarbon phase is primarily comprised of the alkylate product and the alkylatable reactant with lesser fractions of the catalyst, the olefin-acting reactant, and other hydrocarbons. The catalysts phase is primarily hydrogen fluoride, with smaller fractions of hydrocarbons and some water. The catalyst phase is recycled and further contacted with reactants to provide a continuous source of catalyst. In prior art, attempts have been made to control the concentration of water and hydrocarbons in the catalyst by withdrawing a minor portion of the recycle stream of catalyst, purifying the portion, and returning it to the catalyst recycle stream. The purification, or regeneration, frees the acid from water and hydrocarbons, which are removed from the process as a constant boiling mixture of hydrogen fluoride and water and as heavy tars. The regeneration procedure does not attempt to provide any beneficial effect on the bulk of the recycled catalyst, except to keep the impurities mentioned above at a fairly low level. The catalyst recycle stream in prior art inevitably contains some hydrocarbons which it is desirable to recover as alkylate product. When these hydrocarbons are returned to the alkylation reactor, they are at least partially converted to undesirable products by reaction, cracking and fluoride formation. They also add to the amount of material which must be handled in the process, requiring larger equipment and, consequently, an undesirable larger investment. The process of the present invention provides a method for eliminating these valuable hydrocarbons from the catalyst recycle stream and recovering them as a portion of the alkylate product.

One of the problems associated with alkylation processes has been the production of low octane side products. The undesirable side reactions in the process include polymerization, or self-reaction between molecules of the olefin-acting reactant, and the formation of less desirable products from the reactants. For example, in an alkylation process wherein isobutane is alkylated by butenes, the production of trimethylpentanes is desired. Other reactions, yielding high molecular weight polymers, dimethylhexanes and $C_7-$ light hydrocarbons, decrease the yield of the desired product and lower the anti-knock value of the alkylate product. A substantial reduction of such undesirable side reactions in an alkylation process is a valuable improvement in alkylation processes. The process of the present invention provides a method for reducing such undesirable side reaction products and increasing the yield and anti-knock value of the alkylate product.

SUMMARY

Therefore, an object of this invention is to provide an alkylation process utilizing hydrogen fluoride catalyst. Another object of this invention is to provide a process for producing an alkylate product having excellent anti-knock properties. Another object of this invention is to provide a method for recovering alkylate product from the hydrogen fluoride catalyst utilized in an alkylation process. Another object of this invention is to provide an alkylation catalyst having optimum amounts of hydrocarbons therein for use in an alkylation process.

In an embodiment, this invention relates to a process for producing an alkylate product from an alkylatable reactant and an olefin-acting reactant, utilizing hydrogen fluoride catalyst, which comprises the steps of: (a) contacting said reactants and said catalyst in an alkylation zone at alkylation conditions; (b) separating at least a portion of the effluent from said alkylation zone into a hydrocarbon stream and a catalyst stream in a separation zone at separation conditions, and recovering said alkylate product in said hydrocarbon stream; and (c) contacting said catalyst stream with said alkylatable reactant in a stripping zone at stripping conditions to provide a second catalyst stream and a second hydrocarbon stream.

In a limited embodiment, this invention relates to a process for producing an alkylate product from an isoparaffin and an olefin by contacting them with hydrogen fluoride catalyst in an alkylation zone, separating the effluent from the alkylation zone in a separation zone to provide a hydrocarbon stream and a catalyst stream, recovering the alkylate product from the hydrocarbon stream, stripping the catalyst stream with said isoparaffin to provide a second catalyst stream and a second hydrocarbon stream and introducing the second catalyst stream to the alkylation zone and the second hydrocarbon stream to the separation zone.

I have found that the hydrogen fluoride catalyst utilized in an alkylation reaction may be improved to provide an alkylate product of higher quality when it is stripped with alkylatable reactant before it is admixed with the reactants in an alkylation zone. The stripping procedure serves two primary purposes. First, it saturates the catalyst stream with the alkylatable reactant. And second, it strips the catalyst of alkylate product entrained and dissolved in the catalyst and makes possible the recovery of the alkylate product so stripped. The importance of saturating the catalyst with the alkylatable reactant, before introducing it to the alkylation zone to form a part of the reaction mixture, lies in that this promotes the reaction between the alkylatable reactant and the olefin-acting reactant, as opposed to self-reaction between olefin-acting molecules.

DESCRIPTION OF THE DRAWING

A better understanding of some aspects and embodiments of the present inventive process may be aided by reference to the accompanying drawing. The drawing is a schematic representation of an embodiment of the process of the invention. It is not intended that the embodiments of the invention are to be limited to the one shown in the drawing. Many other embodiments, modifications and aspects of the present invention will become apparent to those skilled in the art from the description herein provided.

Olefin feed in conduit 1 is commingled with isoparaffin recycle and make-up in conduit 11 and introduced into alkylation reactor 2. Hydrogen fluoride catalyst is introduced to alkylation reactor 2 through conduit 29. The effluent from the alkylation reactor is charged to mixer-settler 4 through conduit 3, and separated into a hydrocarbon phase and a catalyst phase. The hydrocarbon phase is withdrawn from mixer-settler 4 through conduit 5 and introduced to isostripper 7, where the alkylate product is separated and withdrawn in the bottoms through conduit 8. Lighter hydrocarbons and acid are withdrawn overhead through conduit 9 and charged to partial condenser 10. In partial condenser 10, light gases and acid are partially separated from isoparaffin. The isoparaffin is withdrawn via conduit 11 and recycled to conduit 1 as described above. Propane, isoparaffin and acid are carried to depropanizer 13 by conduit 12, where further isoparaffin is separated and charged via conduit 14 to conduit 11. The acid and propane flow via conduits 15 and 16 to heat exchanger 17 where they are cooled and condensed, and then through conduit 18 to settler 19. In settler 19, fairly pure catalyst is separated and returned to conduit 29 by conduit 20. Propane and acid flow by conduit 21 to HF stripper 22, where propane is withdrawn by conduit 23. Overhead from HF stripper 22, is carried via conduit 24 to conduit 16, where it is commingled with the overhead from depropanizer 13.

The catalyst phase in mixer-settler 4 is withdrawn through conduit 6 and introduced to recycle catalyst stripper 27. A portion of the isoparaffin in conduit 11 is diverted through conduit 26 and charged to recycle catalyst stripper 27 where it is used to strip the catalyst charged from mixer-settler 4. The isoparaffin-saturated catalyst is withdrawn from stripper 27 and recycled to alkylation reactor 2 by way of conduit 29. A slip stream of catalyst is withdrawn from conduit 29 through conduit 30, regenerated, and returned by conduit 31. The hydrocarbons in recycle catalyst stripper 27 are withdrawn through conduit 28 and charged to mixer-settler 4. Isoparaffin needed as make-up is introduced to conduit 11 through conduit 25.

DETAILED DESCRIPTION

The process of the present invention may be utilized for the alkylation of such alkylatable reactants as isobutane, isopentane, isohexane, etc. The preferred alkylatable reactant is isobutane. A mixture of alkylatable reactants may be utilized. For example, a mixture of isobutane and isopentane is a suitable alkylatable reactant. An alkylatable compound diluted by gases such as $C_1$–$C_5$ saturated hydrocarbons, nitrogen, hydrogen, etc. may be utilized as an alkylatable reactant in the present process.

Olefin-acting reactants within the scope of the invention include $C_3$–$C_{20}$ mono- and poly-olefins and alkyl halides. Among the olefins which may be utilized, the $C_3$–$C_6$ mono-olefins are preferred, particularly propene, 1-butene, 2-butene, and isobutylene, and from these, especially 2-butene. Among the alkyl halides which may be utilized, the $C_3$–$C_6$ alkyl halides are preferred. Particularly preferred are $C_3$–$C_6$ alkyl monofluorides, e.g., butyl fluorides. Olefin-acting compounds may be utilized where they are diluted with such materials as $C_1$–$C_5$ saturated hydrocarbons, nitrogen, hydrogen, etc. Mixtures of various olefin-acting compounds are suitable. For example, a petroleum refinery stream containing such olefin-acting compounds as propene and butenes diluted by methane, ethane, propane, butanes, nitrogen, and hydrogen is a readily available source of olefin-acting reactant and is suitable for use in the process of this invention.

The hydrogen fluoride catalyst suitable for use in the process of this invention comprises at least about 70% hydrogen fluoride and less than about 5% water by weight. Catalyst containing soluble hydrocarbons having a molecular weight of from about 100 to about 500, e.g., organic diluents or acid-soluble oils, is suitable for use in the present inventive process. Preferably, the catalyst to be utilized will comprise about 80 to about 90% hydrogen fluoride, and less than about 2% water by weight.

An alkylation zone employed in an embodiment of the present invention may be any means which will suitably contain the reaction mixture at alkylation conditions. Various suitable alkylation vessels are known to prior art. The alkylation zone may be continuous with a separation zone for settling the catalyst and hydrocarbon phases or may be separated from such a separation zone with suitable means for transferring the alkylation zone effluent to the separation zone. Alkylation conditions in the alkylation zone include a temperature within the range from about 0° F. to about 200° F. and a pressure within the range from about 1 atmosphere to about 50 atmospheres. In an embodiment of the invention wherein an isoparaffin is alkylated with a $C_3$–$C_5$ mono-olefin, alkylation conditions preferably include a temperature of from about 25° F. to about 150° F. and a pressure of from about 5 atmospheres to about 20 atmospheres. Preferably, alkylation conditions include a temperature and pressure sufficient to maintain the components of the reaction mixture in the liquid phase. Means for thoroughly admixing the catalyst with the reactants should be provided. A method for withdrawing heat from the alkylation zone should be provided. For example, the heat generated in the alkylation reaction may be withdrawn directly from the alkylation zone by indirect heat exchange between cooling water and the reaction mixture. In another embodiment, the catalyst to be introduced to the alkylation zone may be cooled before hand to act as a heat sink in the alkylation zone. Also suitable would be a method for cooling the alkylation zone in which the hydrocarbons to be introduced to the alkylation zone are cooled to act as a heat sink in the alkylation zone.

Separation zones suitable for separating a hydrocarbon phase from a catalyst phase are well known in the art of alkylation processes. As stated, a suitable separation zone may be continuous with, or distinct from, the alkylation zone employed in a particular embodiment. The settling conditions which are suitable in an embodiment of the present process are substantially the same as the described alkylation conditions with respect to temperature and pressure. The hydrocarbon phase and catalyst phase should be maintained in the liquid phase.

Methods and means for recovering the alkylate product by separation from other components of the hydrocarbon phase settled out from the catalyst phase are well known. The scope of the present invention includes any suitable method for recovering the alkylate product from the hydrocarbon phase. A method for recovering the product which provides a convenient source of alkylatable hydrocarbon for use in stripping the catalyst phase is preferred. Prior art alkylation processes invariably utilize means to recover and recycle alkylatable reactant for further use. Any such source of recycle alkylatable reactant may provide all or a part of the portion of alkylatable reactant which is utilized to strip the catalyst. For example, the overhead from a separator which separates the alkylate product from lighter materials, e.g., an isostripper, may suitably be utilized to strip the catalyst. Another suitable source of alkylatable reactant is the bottoms from a separator to separate lighter materials and acid from alkylatable reactant in the overhead from an isostripper, e.g., depropanizer bottoms.

The stripping zone employed in an embodiment of the present process may be any vessel or means for contacting the recycle catalyst stream with the stripping stream of alkylatable reactant in substantially counter-current flow. The zone employed must be capable of maintaining the catalyst stream in a liquid phase. Preferably, means should be provided for insuring intimate contact between the catalyst and the stripping stream in the stripping zone. A conventional stripping vessel containing trays or packing to insure contact between the streams is suitable, although any method for contacting the stripping stream with the catalyst stream is within the scope of this invention. For example a tower into which the streams are sprayed and which contains no trays or packing is suitable. Stripping conditions include a temperature and pressure sufficient to maintain the hydrogen fluoride in the catalyst recycle stream in the liquid phase, i.e., a temperature in the range from about 0° F. to about 250° F. and a pressure in the range from about 1 atmosphere to about 50 atmospheres. Preferably, stripping conditions include a temperature in the range from about 50° F. to about 150° F. and a pressure in the range from about 10 atmospheres to about 25 atmospheres.

Two primary results are obtained by the stripping procedure. The first result is the saturation of the recycle stream of catalyst with the alkylatable reactant after stripping. When the catalyst recycle stream is subsequently charged to the alkylation zone and contacted with the reactants, particularly the olefin-acting reactant, the reaction between the alkylatable reactant and the olefin-acting reactant is favored, and other reactions, such as polymerization, are substantially reduced. Since it is thought that the actual alkylation reaction takes place in the catalyst phase in the alkylation reaction mixture, saturation of the catalyst phase with alkylatable reactant increases the likelihood of the desired alkylation reaction taking place. The lower the relative concentration of the olefin-acting reactant, the more the desired reaction is favored over side reactions. The second primary result of the saturation procedure is the recovery of alkylate product from the recycle catalyst stream. The stripping stream of alkylatable reactant strips the acid of hydrocarbons and alkyl fluorides, and may be subsequently treated to recover the product stripped from the catalyst. One method for recovering the alkylate product from the stripping stream, preferred in the present process, is to charge the stripping stream to the settler wherein the alkylation reaction mixture is separated into the hydrocarbon and catalyst phases. The stripped product and stripping stream are thereafter processed with the hydrocarbon phase recovered from the alkylation reaction mixture. This method has the advantage of requiring no means outside the scope of the alkylation process for the recovery of the stripped product. By stripping and recovering the alkylate which would otherwise be recycled to the alkylation zone, the destruction of all or a part of the product in the recycle catalyst stream may be eliminated. When alkylate product is returned to the alkylation zone, it may react further to produce a heavy $C_9+$ side product or may be cracked to produce $C_7-$ light side product, both of which are of little utility. The recycle of alkylate product with the catalyst also creates a certain amount of excess material which must be processed, and which necessitates the enlargement of means required to handle the flow of material through the alkylation reactor. The elimination of undesirable side reactions and unnecessary recycle requirements, results in an alkylation process which provides a greater yield of an alkylate product having superior anti-knock properties.

I claim as my invention:

1. An alkylation process which comprises reacting an isoparaffin with an olefin-acting reactant in contact with hydrogen fluoride catalyst at alkylation conditions, separating the resultant reaction mixture into a hydrocarbon phase and a catalyst phase, separating from said hydrocarbon phase an alkylate product and unreacted isoparaffin counterconcurrently stripping said catalyst phase in liquid form with at least a portion of said unreacted isoparaffin to separate an overhead stream of hydrocarbons and alkyl fluorides from the catalyst phase and to saturate the latter with isoparaffin, and passing the stripped isoparaffin-saturated catalyst liquid from said stripping step to the aforesaid alkylating step.

2. The process of claim 1 further characterized in that said hydrocarbons and alkyl fluorides are supplied to said reaction mixture in said first-mentioned separating step.

3. The process of claim 1 further characterized in that said isoparaffin contains from about 4 to 6 carbon atoms per molecule.

4. The process of claim 1 further characterized in that said isoparaffin is isobutane.

5. The process of claim 1 further characterized in that said olefin-acting reactant is a mono-olefinic hydrocarbon selected from the group consisting of propene, butenes and pentenes.

6. The process of claim 1 further characterized in that said olefin-acting reactant is an alkyl halide.

References Cited

UNITED STATES PATENTS

| | | | |
|---|---|---|---|
| 3,171,865 | 3/1965 | Davison et al. | 260—683.48 |
| 3,223,749 | 12/1965 | Van Pool et al. | 260—683.48 |
| 3,249,650 | 5/1966 | Fenske | 260—683.48 |
| 3,410,759 | 11/1968 | Fontenot et al. | 260—683.48 |
| 2,914,590 | 11/1959 | Van Pool | 260—683.48 |
| 3,431,079 | 3/1969 | Chapman | 260—683.48 |

DELBERT E. GANTZ, Primary Examiner

G. J. CRASANAKIS, Assistant Examiner

U.S. Cl. X.R.

260—683.42